(12) United States Patent
Veggian et al.

(10) Patent No.: US 10,829,077 B2
(45) Date of Patent: Nov. 10, 2020

(54) VEHICLE SEAT SIDE AIRBAG BRACKET

(71) Applicant: Ford Global Technologies, LLC, Dearborn, MI (US)

(72) Inventors: Eric D. Veggian, Superior Township, MI (US); Jeffrey Charles Paddock, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 19 days.

(21) Appl. No.: 16/295,849

(22) Filed: Mar. 7, 2019

(65) Prior Publication Data

US 2020/0282938 A1 Sep. 10, 2020

(51) Int. Cl.
*B60R 21/207* (2006.01)
*B60R 21/26* (2011.01)

(52) U.S. Cl.
CPC ........... *B60R 21/207* (2013.01); *B60R 21/26* (2013.01)

(58) Field of Classification Search
CPC ....... B60R 21/207; B60R 21/26; B60R 21/20; B60R 21/217; B60N 2/68
See application file for complete search history.

(56) References Cited

U.S. PATENT DOCUMENTS

| | | | |
|---|---|---|---|
| 5,503,428 A | 4/1996 | Awotwi et al. | |
| 5,542,691 A * | 8/1996 | Marjanski | B60R 21/201 |
| | | | 280/728.2 |
| 5,542,696 A | 8/1996 | Steffens, Jr. et al. | |
| 5,547,214 A * | 8/1996 | Zimmerman, II | B60N 2/58 |
| | | | 280/730.1 |
| 5,779,263 A | 7/1998 | Lane, Jr. et al. | |
| 5,895,070 A | 4/1999 | Crimmins et al. | |
| 5,899,489 A | 5/1999 | Jost | |
| 6,142,508 A | 11/2000 | Lewis | |
| 6,231,069 B1 | 5/2001 | Yokoyama | |
| 6,425,602 B1 | 7/2002 | Al-Amin et al. | |
| 6,428,036 B1 | 8/2002 | Mramor et al. | |
| 8,210,568 B2 * | 7/2012 | Ryden | B60R 21/207 |
| | | | 280/728.2 |
| 8,814,204 B2 | 8/2014 | Fukawatase | |
| 10,507,782 B2 * | 12/2019 | Nagata | B60R 21/2171 |
| 2003/0132616 A1 | 7/2003 | Yanagibashi et al. | |
| 2018/0009353 A1 * | 1/2018 | Yokoyama | B60N 2/20 |
| 2018/0194316 A1 | 7/2018 | Mampe | |
| 2019/0092271 A1 * | 3/2019 | Park | B60R 21/23138 |

FOREIGN PATENT DOCUMENTS

JP 2007030733 A 2/2007

OTHER PUBLICATIONS

Search Report dated Aug. 20, 2020 regarding Application No. GB2002577.1 issued by the United Kingdom Intellectual Property Office(2 pages).

* cited by examiner

*Primary Examiner* — Faye M Fleming
(74) *Attorney, Agent, or Firm* — Frank A. MacKenzie; Bejin Bieneman PLC

(57) ABSTRACT

A system includes a seat frame member, an airbag disposed outboard of the seat frame member, an inflator disposed inboard of the seat frame member, and a bracket extending through the seat frame member. The bracket includes an upper portion and a lower portion spaced from each other and disposed inboard of the seat frame member, and an intermediate portion extending from the upper portion to the lower portion and disposed outboard of the seat frame member. The bracket supports the inflator and the airbag.

20 Claims, 7 Drawing Sheets

VEHICLE SEAT SIDE AIRBAG BRACKET

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

Figure 1:
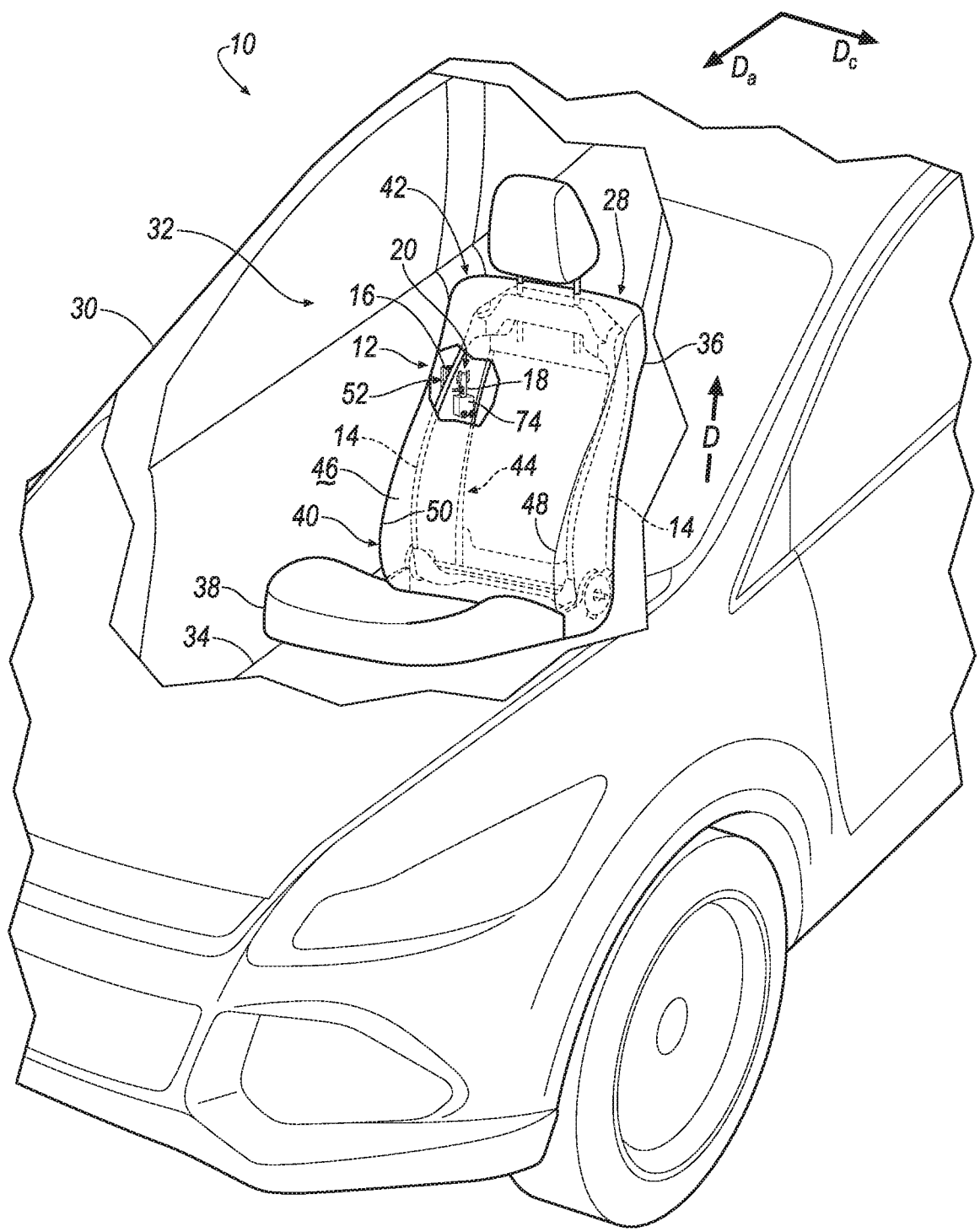
FIG. 1 is a perspective view of a vehicle including a seat supporting a restraint system having an airbag in an uninflated position.

A system includes a seat frame member, an airbag disposed outboard of the seat frame member, an inflator disposed inboard of the seat frame member, and a bracket extending through the seat frame member. The bracket includes an upper portion and a lower portion spaced from each other and disposed inboard of the seat frame member, and an intermediate portion extending from the upper portion to the lower portion and disposed outboard of the seat frame member. The bracket supports the inflator and the airbag.

The airbag may define an inflation chamber. The bracket may extend through the airbag into the inflation chamber.

The intermediate portion of the bracket may be disposed in the inflation chamber.

The system may include a lower opening disposed adjacent to the lower portion and extending through the seat frame member and the airbag into the inflation chamber. The bracket may extend through the lower opening.

The system may include an upper opening disposed adjacent to the upper portion and extending through the seat frame member and the airbag into the inflation chamber. The bracket may extend through the upper opening.

The system may include a hole disposed between the lower portion and the upper portion and extending through the seat frame member and the airbag into the inflation chamber. The inflator may be in fluid communication with the inflation chamber through the hole.

The bracket may include two legs spaced from each other. The hole may be disposed between the legs of the bracket.

The system may include a manifold disposed inboard of the seat frame and fixed to the lower portion of the bracket. The inflator may be supported by the manifold.

The manifold may be disposed adjacent to the hole and may define a chamber in fluid communication with the hole. The inflator may extend into the chamber.

The manifold may abut the seat frame member around the hole.

The lower portion may be elongated transverse to the upper portion.

The intermediate portion may be elongated from the lower portion to the upper portion.

The upper portion may be elongated parallel to the intermediate portion.

The inflator may be disposed between the upper portion and the lower portion of the bracket.

The bracket may include two legs spaced from each other. The inflator may be disposed between the legs of the bracket.

The bracket may include a crossmember extending from one leg to the other leg. The crossmember may extend around the inflator.

The system may include a manifold disposed inboard of the seat frame and fixed to the lower portion of the bracket. The inflator may be supported by the manifold.

The airbag and the seat frame member may be compressed between the intermediate portion and the manifold.

The manifold may define a chamber. The inflator may extend into the chamber and be in fluid communication with the airbag through the chamber.

The system may include a support disposed between the manifold and the upper portion of the bracket. The inflator may be fixed to the support.

With reference to the Figures, wherein like numerals indicate like parts throughout the several views, a vehicle 10 is generally shown. The vehicle 10 includes a restraint system 12 having a seat frame member 14, an airbag 16 disposed outboard of the seat frame member 14, an inflator 18 disposed inboard of the seat frame member 14, and a bracket 20 extending through the seat frame member 14. The bracket 20 includes an upper portion 22 and a lower portion 24 spaced from each other and disposed inboard of the seat frame member 14, and an intermediate portion 26 extending from the upper portion 22 to the lower portion 24 and disposed outboard of the seat frame member 14. The bracket 20 supports the inflator 18 and the airbag 16.

Figure 2:
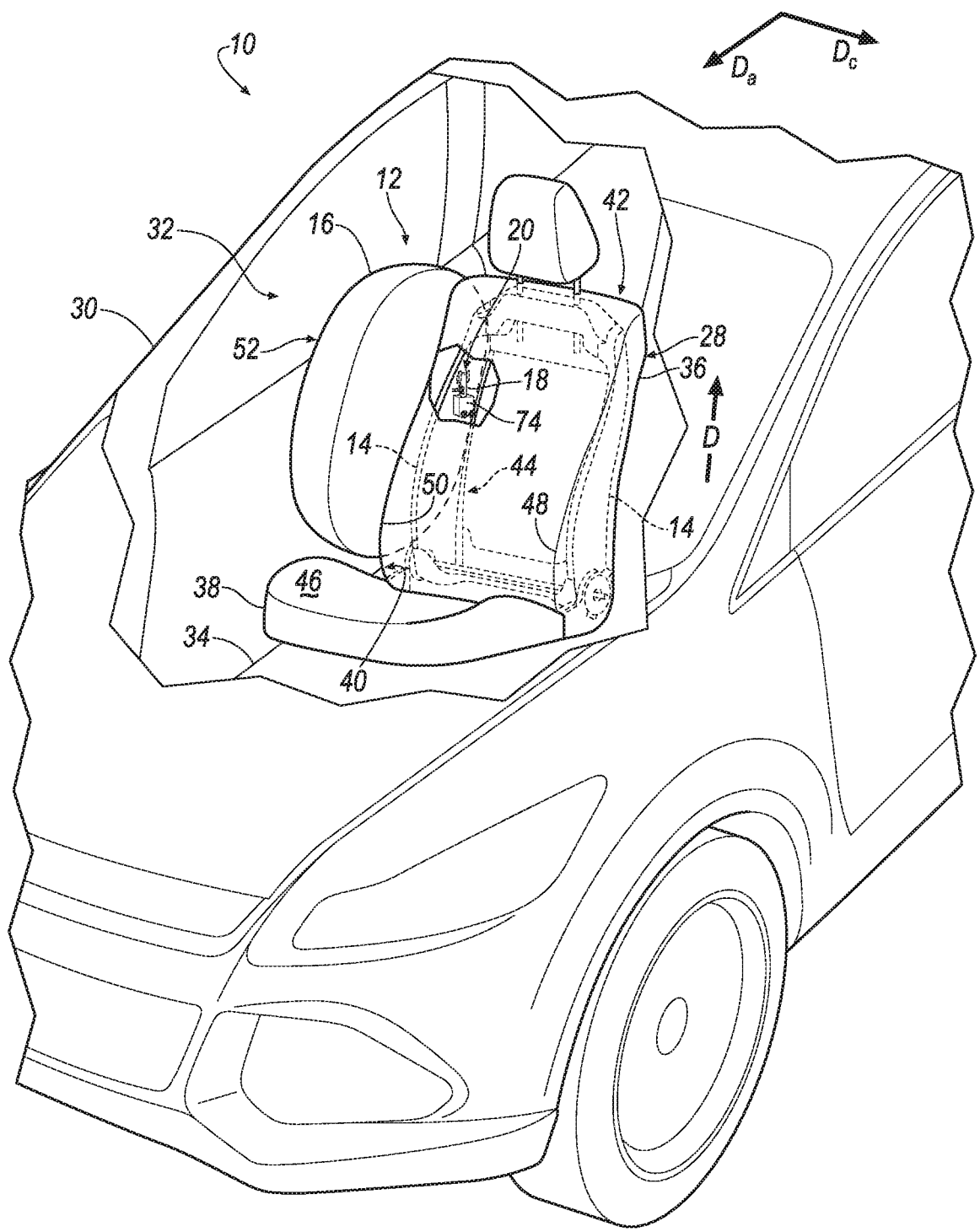
FIG. 2 is a perspective view of the vehicle including the seat supporting the restraint system having the airbag in an inflated position.

The restraint system 12 may be disposed in a seat 28, as discussed below. Since the restraint system 12 is disposed in the seat 28, the restraint system 12 may be subject to packaging constraints, e.g., a maximum width of the seat 28. Components disposed outboard of the seat frame member 14 may increase the width of the seat 28 because the seat 28 extends around the components disposed outboard of the seat frame member 14. The location of the airbag 16 outboard of the seat frame member 14 allows the airbag 16 to inflate from an uninflated position, as shown in FIG. 1, to an inflated position, as shown in FIG. 2, along a side of the occupant during a vehicle impact. Since the bracket 20 extends through the seat frame member 14, the inflator 18 may be disposed on the opposite side, i.e., inboard, of the seat frame member 14 as the airbag 16. By disposing the inflator 18 inboard of the seat frame member 14, fewer components may be disposed outboard of the seat frame member 14, which may assist in reducing the width of the seat 28. In such an example, the airbag 16 may be disposed closer to the seat frame member 14 as compared to when the inflator 18 and the airbag 16 are disposed on the same side of the seat frame member 14.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

The vehicle 10 may include two sides (not numbered) spaced from each other in a cross-vehicle direction Dc. The sides of the vehicle 10 may be elongated in a vehicle fore-and-aft direction Da. Each side of the vehicle 10 may be similar or identical to each other.

With reference to FIG. 1, the vehicle 10 includes a body 30 defining a passenger cabin 32. The passenger cabin 32 houses occupants, if any, of the vehicle 10. The passenger cabin 32 includes a front end (not numbered) and a rear end (not numbered) with the front end being in front of the rear end during forward movement of the vehicle 10. The passenger cabin 32 includes one or more seats 28. The seats 28 may be arranged in any suitable arrangement. For example, one or more of the seats 28 may be at the front end of the passenger cabin 32, i.e., a front seat, and/or one or more of the seats 28 may be at the rear end of the passenger cabin 32, i.e., a rear seat.

With reference to FIG. 1, each seat 28 may include a seatback 36, a seat bottom 38, and a head restraint (not numbered). The head restraint may be supported by the seatback 36 and may be stationary or movable relative to the seatback 36. The seatback 36 may be supported by the seat bottom 38 and may be stationary or movable relative to the seat bottom 38. The seatback 36, the seat bottom 38, and/or the head restraint may be adjustable in multiple degrees of freedom. Specifically, the seatback 36, the seat bottom 38, and/or the head restraint may themselves be adjustable, in other words, adjustable components within the seatback 36, the seat bottom 38, and/or the head restraint, and/or may be adjustable relative to each other.

With continued reference to FIG. 1, the seatback 36 may include a lower end 40 adjacent to the seat bottom 38 and an upper end 42 spaced from the lower end 40. The upper end 42 may be spaced from the lower end 40 along a direction D transverse to the vehicle fore-and-aft direction Da and the cross-vehicle direction Dc. The upper end 42 may be adjacent to the head restraint. Specifically, the upper end 42 of the seatback 36 may support the head restraint.

Each seat 28 may include a seat frame 44. The seat frame 44 may include tubes, beams, etc. The seat frame 44 may be formed of any suitable plastic material, e.g., carbon fiber reinforced plastic (CFRP), glass fiber-reinforced semi-finished thermoplastic composite (organosheet), etc. As another example, some or all components of the seat frame 44 may be formed of a suitable metal, e.g., steel, aluminum, etc.

With reference to FIG. 1, the seat frame 44 may include at least two seat frame members 14 spaced from each other in the cross-vehicle direction Dc. Each seat frame member 14 may be elongated in the direction D. For example, each seat frame member 14 may extend from the lower end 40 to the upper end 42 of the seatback 36.

With continued reference to FIG. 1, a covering 46 may be supported on the seat frame 44. The covering 46 may include upholstery and padding. The upholstery may be formed of cloth, leather, faux leather, or any other suitable material. The upholstery may be stitched in panels around the seat frame 44. The padding may be between the covering 46 and the seat frame 44 and may be foam or any other suitable material.

With continued reference to FIG. 1, the seatback 36 may include an inboard side 48 and an outboard side 50 spaced from the inboard side 48 in the cross-vehicle direction Dc. The outboard side 50 of the seatback 36 may be disposed between the inboard side 48 of the seatback 36 and a vehicle door (not numbered). The seatback 36 may terminate at the sides 48, 50. A backrest (not numbered) may extend from the inboard side 48 to the outboard side 50. The sides 48, 50 of the seatback 36 may extend from the backrest in a direction that an occupant of the seat 28 would face, that is, in a forward direction as defined by the seat 28. The sides 48, 50 of the seatback 36 may extend along the seatback 36 in an upward direction as defined by the seat 28, i.e., the direction D. For example, the sides 48, 50 of the seatback 36 may extend from the lower end 40 towards the upper end 42 of the seatback 36. Specifically, each side 48, 50 may extend along one respective seat frame member 14 of the seat frame 44. The sides 48, 50 of the seatback 36 may support an occupant laterally relative to the seat 28.

With reference to FIG. 1, the seatback 36, e.g., the covering 46, may include a tear seam (not shown). The tear seam may be disposed on at least one side 48, 50 of the seatback 36. For example, the tear seam may be disposed adjacent to the airbag 16. Said differently, the airbag 16 may extend through the tear seam in the inflated position. The tear seam may have any suitable shape. For example, the tear seam may have a linear shape, i.e., extending in a line in the cross-vehicle direction Dc. Alternatively, the tear seam may have a circular shape, e.g., extending around the airbag 16.

The tear seam may be designed to tear apart when subjected to a tensile force above a threshold magnitude. In other words, the covering 46 on one side of the tear seam separates from the covering 46 on the other side of the tear seam when the force is above the threshold magnitude. The threshold magnitude may be chosen to be greater than forces from, e.g., inadvertent pushing against the seatback 36 by an occupant but be less than forces from the deployment of the airbag 16. The tear seam may be, for example, a line of perforations through the covering 46, a line of thinner covering material than the rest of the covering 46, etc.

With continued reference to FIG. 1, the body 30 includes a floor 34. The floor 34 may define the lower boundary of the passenger cabin 32 and may extend from the front end of the passenger cabin 32 to the rear end of the passenger cabin 32. Additionally, the floor 34 may extend from one side of the vehicle 10 to another side of the vehicle 10.

Each seat 28 is supported by the floor 34, as shown in FIG. 1. The position and orientation of the seats 28 and components thereof may be adjustable by an occupant. In this situation, each seat 28 may slide relative to the floor 34, e.g., in the vehicle fore-and-aft direction Da, along a seat track (not shown). Additionally, or alternatively, each seat 28 may be rotatable relative to the floor 34. Each seat 28 may pivot about an axis extending through the floor 34 and the seat bottom 38. The seat 28 may rotate to face any number of directions. As another example, each seat 28 may be fixed relative to the floor 34. In this situation, the seats 28 may be immovable relative to the floor 34.

The vehicle 10 may include any suitable number of restraint systems 12. For example, the vehicle 10 may include one restraint system 12 on each seat 28. In such an example, the restraint system 12 may be disposed on one of the inboard side 48 and the outboard side 50 of each seatback 36. Specifically, the restraint system 12 may be disposed on the outboard side 50 of each seatback 36, as shown in FIG. 1. As another example, the vehicle 10 may include a plurality of restraint systems 12 on each seat 28. In such an example, one restraint system 12 may be disposed on each side 48, 50 of each seatback 36.

As shown in the Figures, the restraint system 12 may include an airbag assembly 52, which includes the airbag 16. The seatback 36 may support the airbag assembly 52, and specifically, may support the airbag 16 when the airbag 16 is in the inflated position. For example, the seat frame member 14 of the outboard side 50 of the seatback 36 may support the airbag assembly 52, as shown in the Figures. In other words, the airbag 16 may be "a side airbag." The airbag assembly 52 may be mounted to the seatback 36, as set forth below.

The airbag 16 may be formed of any suitable type of material, e.g., from a woven polymer. For example, the airbag 16 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 16 may be a single continuous unit, e.g., a single piece of fabric. Alternatively, the airbag 16 may include a plurality of segments, i.e., two or more. The segments may be attached to each other in any suitable fashion, e.g., a plurality of panels attached by stitching, ultrasonic welding, etc.

The airbag 16 may be inflatable from the uninflated position to the inflated position, as set forth above. Specifically, the airbag 16 may define an inflation chamber 54 that inflates from the uninflated position to the inflated position during inflation. For example, the airbag 16, i.e., the inflation chamber 54, may be inflatable between the occupant and another vehicle component, e.g., a door, a center console, etc. In the uninflated position, the airbag 16 may be disposed in the seatback 36, i.e., behind the covering 46. In the inflated position, the airbag 16 may break the covering 46, i.e., the tear seam, and inflate outwardly from the seatback 36. The airbag 16 may abut the seat frame member 14 in both the uninflated position and the inflated position.

Figure 3A:
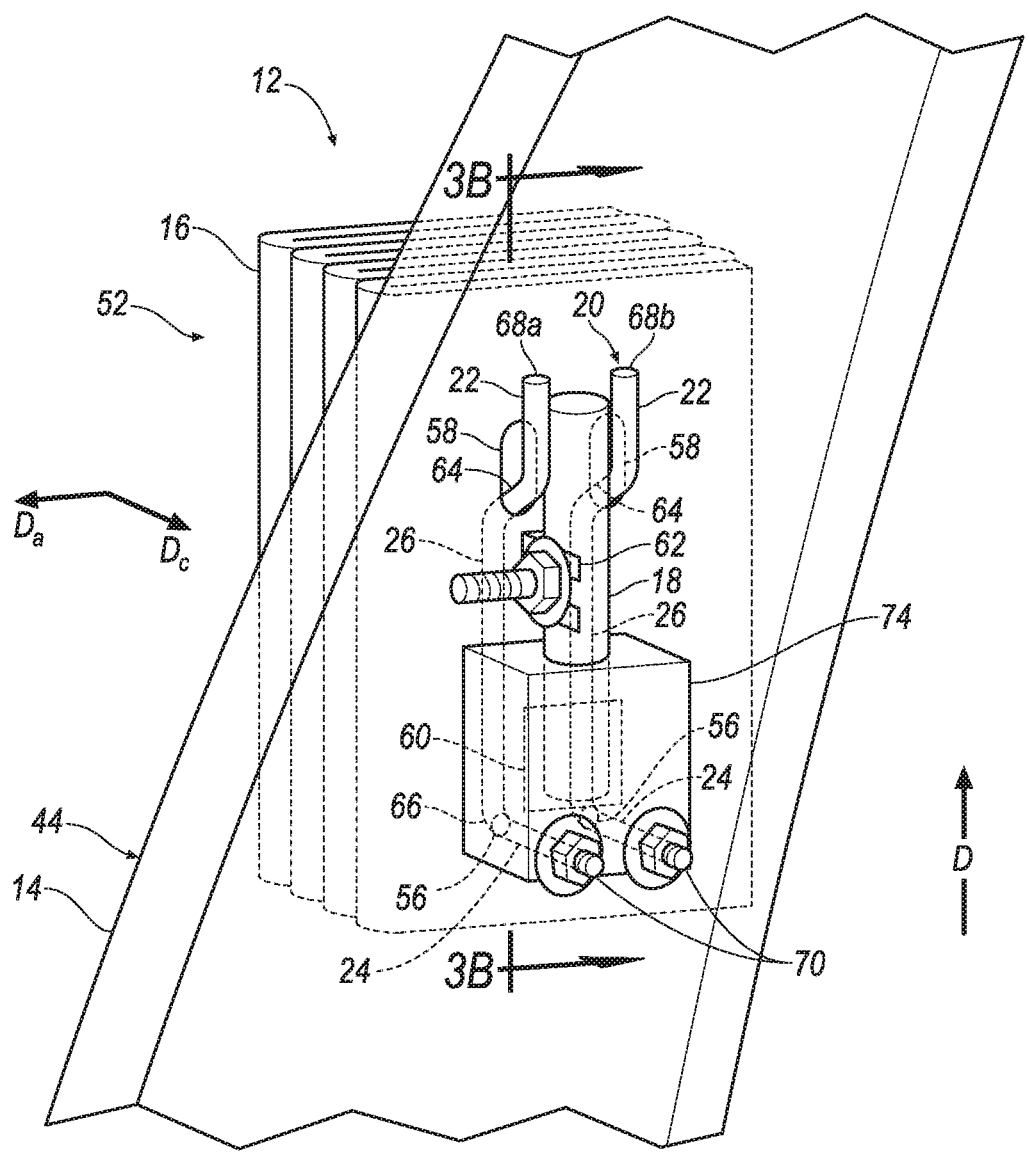
FIG. 3A is a perspective view of an embodiment of a bracket supporting the airbag and an inflator on opposite sides of a seat frame member.
Figure 3B:
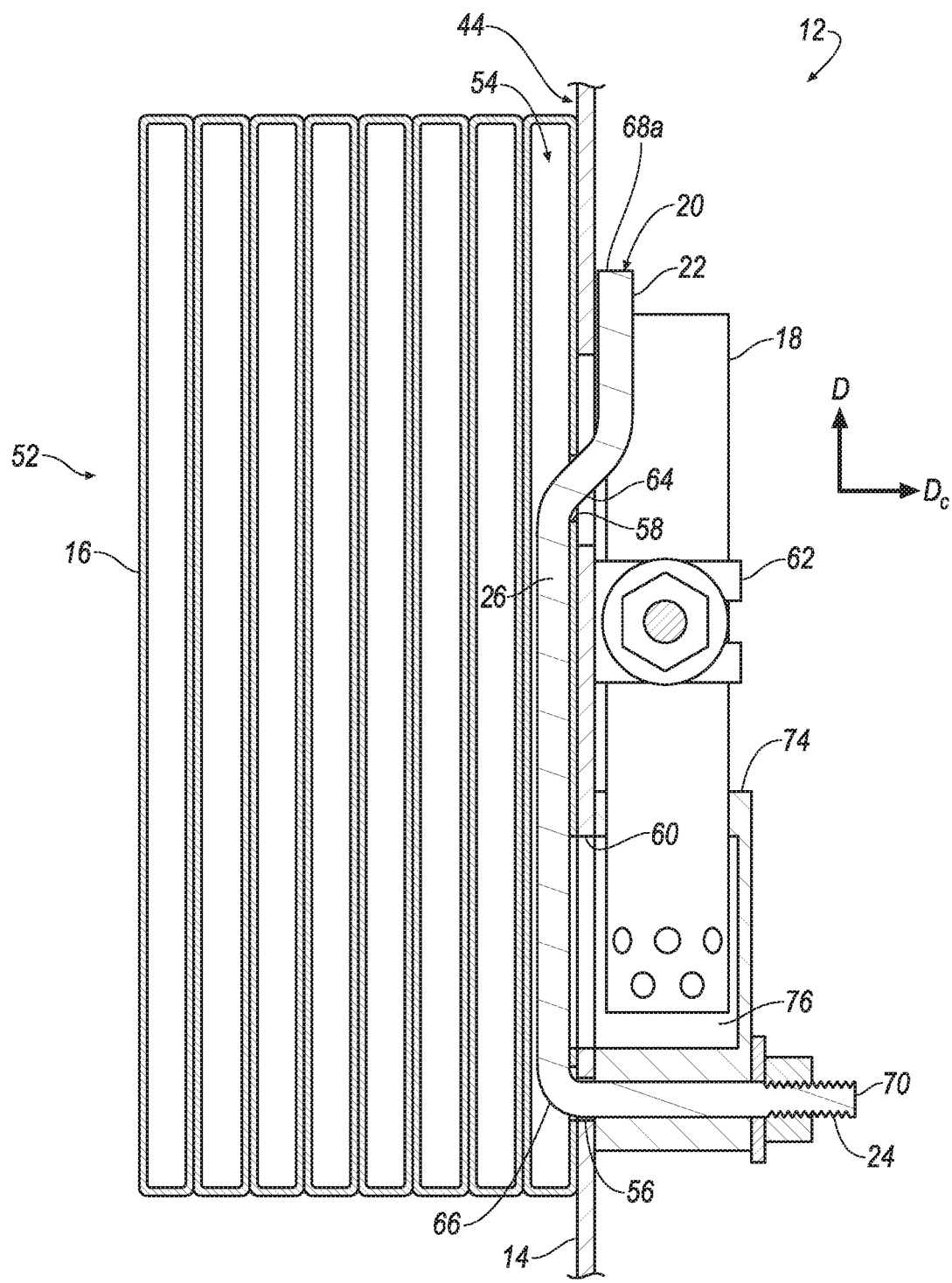
FIG. 3B is a side view of the embodiment of the bracket supporting the airbag and the inflator on opposite sides of the seat frame member.
Figure 4:
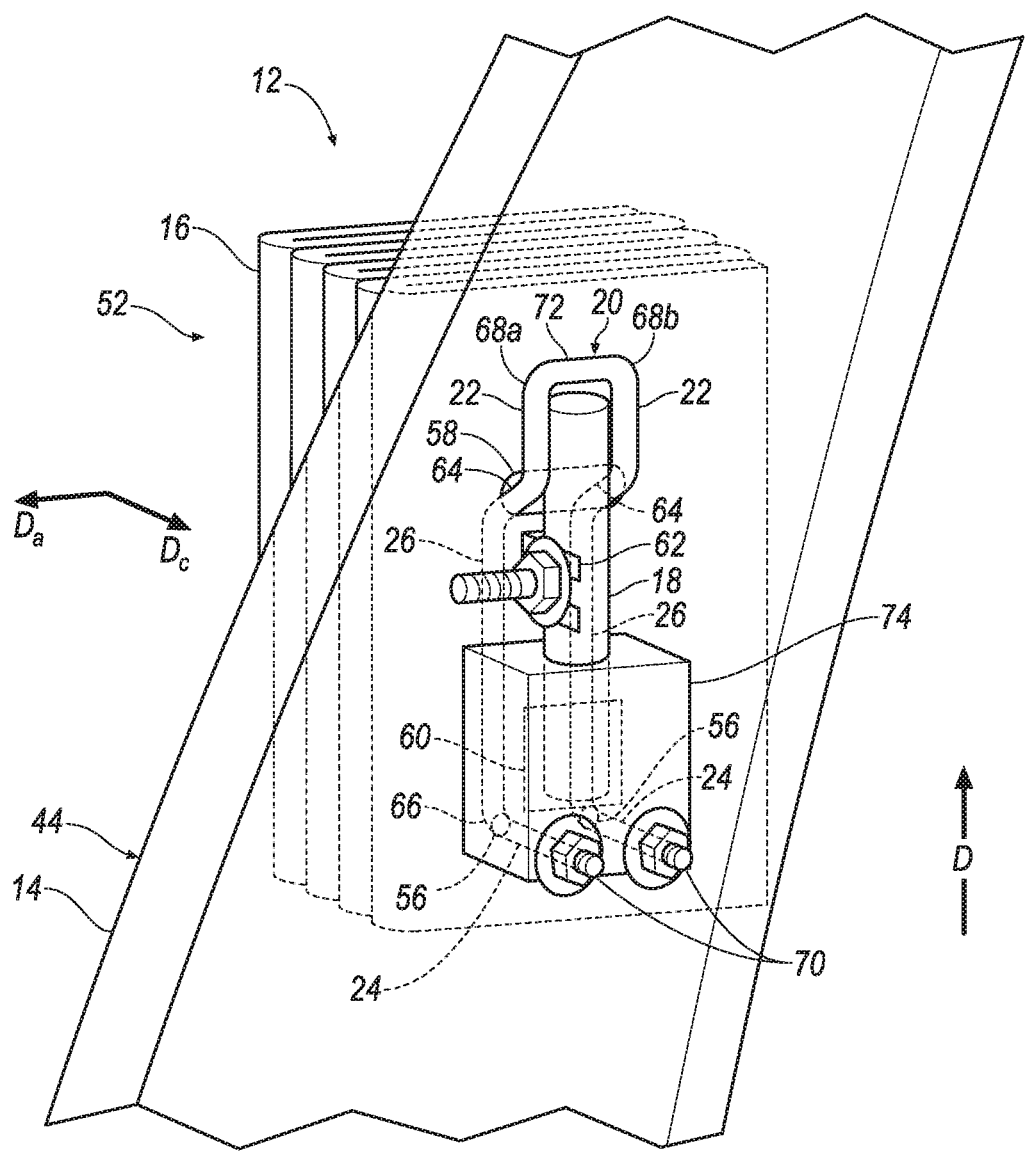
FIG. 4 is a perspective view of another embodiment of the bracket supporting the airbag and the inflator on opposite sides of the seat frame member.
Figure 5:
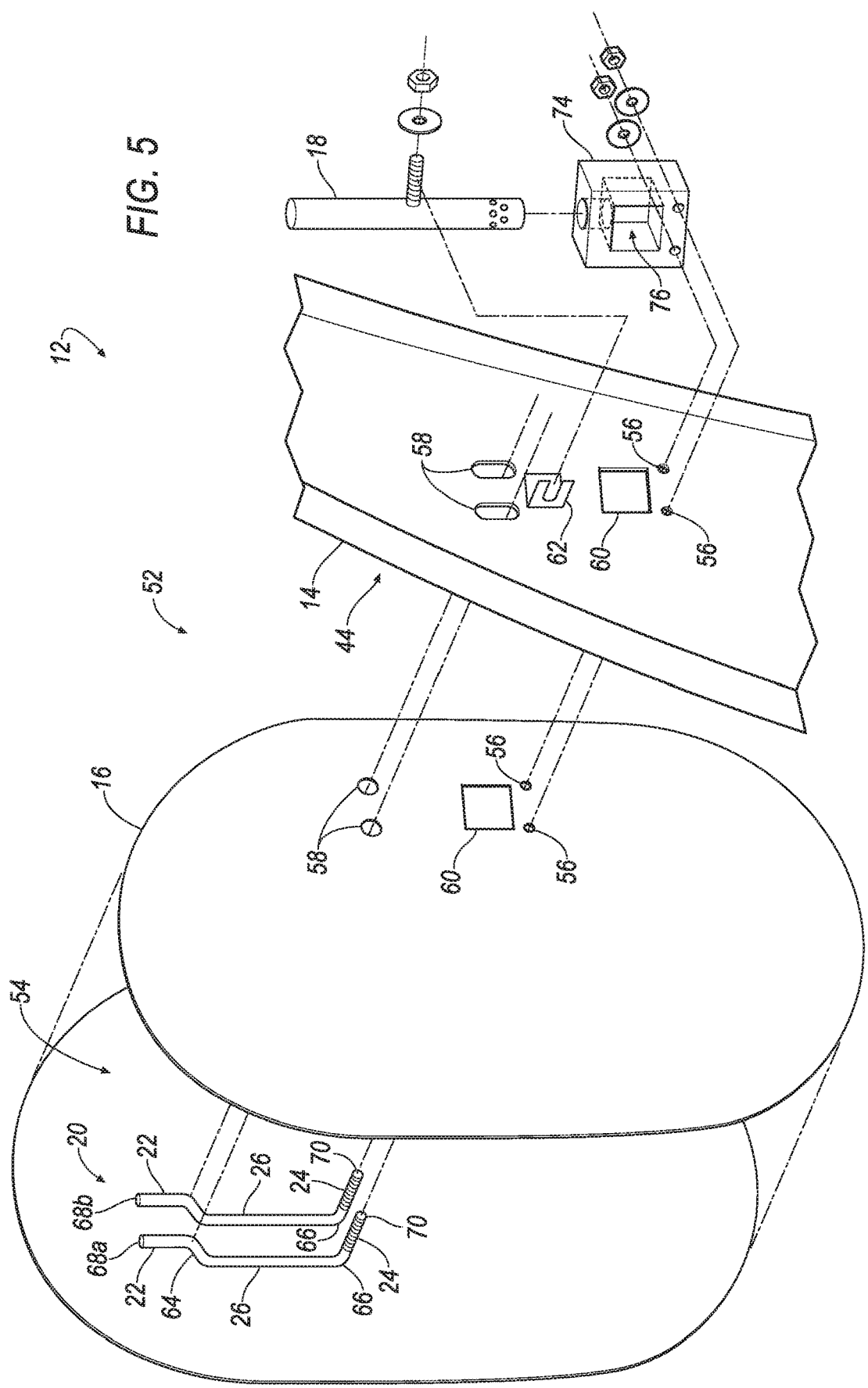
FIG. 5 is an exploded view of the restraint system of the vehicle.

The restraint system 12 may include a lower opening 56 disposed adjacent to the lower portion 24 of the bracket 20. The lower opening 56 may extend in the cross-vehicle direction Dc through the seat frame member 14 and the airbag 16 into the inflation chamber 54, as shown in FIGS. 3B and 5. The lower opening 56 may be designed, i.e., sized and positioned, to receive the bracket 20. In other words, the bracket 20 may extend through the lower opening 56, as shown in FIGS. 3A-5. The restraint system 12 may include any suitable number of lower openings 56. For example, the restraint system 12 may include two lower openings 56 spaced from each other in the vehicle fore-and-aft direction Da, as shown in FIGS. 3A-5. In this situation, the bracket 20 may extend through each lower opening 56. In such an example, each lower opening 56 may have a circular shape. As another example, the restraint system 12 may include one lower opening 56. In such an example, the lower opening 56 may be elongated in the vehicle fore-and-aft direction Da, i.e., a slot (not shown).

The restraint system 12 may include an upper opening 58 spaced from the lower opening 56 in the direction D. The upper opening 58 may, for example, be disposed adjacent to the upper portion 22 of the bracket 20. The upper opening 58 may extend in the cross-vehicle direction Dc through the seat frame member 14 and the airbag 16 into the inflation chamber 54, as shown in FIGS. 3B and 5. The upper opening 58 may be designed, i.e., sized and positioned, to receive the bracket 20. In other words, the bracket 20 may extend through the upper opening 58. The restraint system 12 may include any suitable number of upper openings 58. For example, the restraint system 12 may include two upper openings 58 spaced from each other in the vehicle fore-and-aft direction Da, as shown in FIGS. 3A and 5. In this situation, the bracket 20 may extend through each upper opening 58. In such an example, each upper opening 58 may have a circular shape. As another example, the restraint system 12 may include one upper opening 58, as shown in FIG. 4. In such an example, the upper opening 58 may be elongated in the vehicle fore-and-aft direction Da. In this situation, the upper opening 58 may be referred to as a slot.

The restraint system 12 may include a hole 60 extending in the cross-vehicle direction Dc through the seat frame member 14 and the airbag 16 into the inflation chamber 54, as shown in FIGS. 3B and 5. The hole 60 may be disposed between the at least one lower opening 56 and the at least one upper opening 58. In other words, the intermediate portion 26 of the bracket 20 may be adjacent to the hole 60, as shown in FIGS. 3A-4. In such an example, the hole 60 may be in fluid communication with the inflation chamber 54. The hole 60 may have any suitable shape, e.g., square, circle, etc., and size, i.e., perimeter.

The bracket 20 may have any suitable shape. For example, the bracket 20 may be substantially L-shaped, e.g., when viewed in the vehicle fore-and-aft direction Da, as shown in FIG. 3B. Additionally, the bracket 20 may have any suitable shape in cross-section transverse to the cross-vehicle direction Dc, e.g., circle, square, etc. The bracket 20 may have any suitable thickness, i.e., the legs 68a, 68b of the bracket 20 may have any suitable size, i.e., diameter, perimeter, etc., in cross-section transverse to the cross-vehicle direction Dc. The bracket 20 may be any suitable material. For example, the bracket 20 may be metal, e.g., steel, aluminum, etc.

The intermediate portion 26 may be elongated from the lower portion 24 to the upper portion 22, i.e., in the direction D, as shown in FIGS. 3A-5. For example, the intermediate portion 26 may extend generally vertical, i.e., along the seat frame member 14, from the lower portion 24 to the upper portion 22, as shown in the Figures.

The intermediate portion 26 may be disposed in the inflation chamber 54, as shown in FIGS. 3B and 5. In other words, the bracket 20 may extend through the airbag 16 and the seat frame member 14 from the intermediate portion 26 to each of the upper and lower portions 22, 24. Said differently, the airbag 16 may be partially disposed, i.e., from the lower portion 24 to the upper portion 22 of the bracket 20, between the intermediate portion 26 of the bracket 20 and the seat frame member 14. The intermediate portion 26 may abut the airbag 16 from the lower portion 24 to the upper portion 22 of the bracket 20.

The upper portion 22 and the lower portion 24 of the bracket 20 may be spaced from each other in the direction D, as shown in FIGS. 3A-4. For example, the upper portion 22 of the bracket 20 may be disposed between the lower portion 24 of the bracket 20 and the upper end 42 of the seatback 36. In other words, the upper portion 22 and the lower portion 24 may be spaced form each other along the seat frame member 14.

At least one of the upper portion 22 and the lower portion 24 is elongated in the cross-vehicle direction Dc. In other words, the intermediate portion 26 extends transverse to at least one of the upper portion 22 and the lower portion 24. The upper portion 22 and the lower portion 24 may, for example, be elongated transverse to each other. As shown in the Figures, the lower portion 24 may be elongated in the cross-vehicle direction Dc, and the upper portion 22 may be elongated transverse to the cross-vehicle direction Dc. In such an example, the upper portion 22 may be elongated parallel to the intermediate portion 26, e.g., in the direction D. As another example, the upper portion 22 may be elongated transverse to both the intermediate portion 26 and the lower portion 24. Alternatively, the upper portion 22 and the lower 24 portion may be elongated parallel to each other. In such an example, both the upper portion 22 and the lower portion 24 may be elongated in the cross-vehicle direction Dc. In other words, the intermediate portion 26 may extend transverse to both the upper portion and the lower portion 24.

The bracket 20 may include an upper transition 64 extending from the intermediate portion 26 to the upper portion 22 and a lower transition 66 extending from the intermediate portion 26 to the lower portion 24, as shown in FIG. 5. The upper transition 64 extends through the at least one upper opening 58, and the lower transition 66 extends through the at least one lower opening 56, as shown in FIG. 3B. In other words, the upper transition 64 and the lower transition 66 each extend through the airbag 16 and the seat frame member 14. The upper transition 64 may be partially disposed in the upper opening 58 and the lower transition 66 may each be partially disposed in the lower opening 56.

The upper transition 64 and the lower transition 66 may have a same or different shape. The upper transition 64 and the lower transition 66 may have any suitable shape, e.g., rounded or angular. For example, the upper transition 64 may be angular and the lower transition 66 may be rounded, as shown in the Figures. In such an example, the upper transition 64 may extend transverse to at least one of the intermediate portion 26 and the upper portion 22. As shown in the Figures, the upper transition 64 may extend transverse to each of the intermediate portion 26 and the upper portion 22.

The bracket 20 may include two legs 68a, 68b spaced from each other in the vehicle fore-and-aft direction Da, as shown in the Figures. One or more components of the restraint system 12 may be disposed between the legs 68a, 68b of the bracket 20. For example, the hole 60 and the inflator 18 may each be disposed between the legs 68a, 68b of the bracket 20, as shown in FIGS. 3A and 4. The legs 68a, 68b may be similar or identical to each other. For example, each leg 68a, 68b may extend through the seat frame member 14 from the intermediate portion 26 to both the upper and lower portions 22, 24.

At least one of the upper portion 22 and the lower portion 24 includes an end 70. The bracket 20, e.g., the legs 68a, 68b, terminates at the end 70. The end 70 may be threaded. In other words, the end 70 may include threads extending about and along the respective portion 22, 24. The threads may be designed to engage with any suitable fastener, e.g., cap nut, flange nut, square nut, etc. One embodiment of the legs 68a, 68b is shown in FIG. 3A, and another embodiment of the legs 68a, 68b is shown in FIG. 4. Common numerals are used to identify common features in the two embodiments.

In the embodiment shown in FIG. 3A, the legs 68a, 68b are separate parts. In this embodiment, each leg 68a, 68b includes an end 70 at the upper portion 22 and an end 70 at the lower portion 24, i.e., each leg 68a, 68b terminates at the respective upper portion 22 and the respective lower portion 24. In this embodiment, the end 70 of the lower portion 24 may be threaded, and the end 70 of the upper portion 22 may lack threads. In this situation, the restraint system 12 includes two upper openings 58 and two lower openings 56. During assembly, each leg 68a, 68b may be inserted through one respective upper opening 58 and one respective lower opening 56.

In the embodiment shown in FIG. 4, the legs 68a, 68b are engaged with each other. In this situation, the bracket 20 includes a crossmember 72 extending from one leg 68a to the other leg 68b. For example, the crossmember 72 may extend from the upper portion 22 of one leg 68a to the upper portion 22 of the other leg 68b, as shown in the Figures. In such an example, the at least one upper opening 58 is a slot designed, i.e., sized and positioned, to receive the crossmember 72. Additionally, the restraint system 12 includes two lower openings 56. In other words, during assembly the crossmember 72 may be inserted through the upper opening, i.e., the slot, and the lower portion 24 of each leg 68a, 68b is inserted through one respective lower opening 56. In this situation, the lower portion 24 of each leg 68a, 68b includes an end 70 having threads. Alternatively, the crossmember 72 may extend from the lower portion 24 of one leg 68a to the lower portion 24 of the other leg 68b. In this situation, the at least one lower opening 56 is a slot designed, i.e., sized and positioned, to receive the crossmember 72. In this situation, the restraint system includes two upper openings 58, and the upper portions 22 of each leg 68a, 68b may include an end 70 having threads. The crossmember 72 may, for example, be unitary with the legs 68a, 68b. As another example, the crossmember 72 may be a separate component and subsequently assembled to the legs 68a, 68b, e.g., by welding.

The crossmember 72 may extend around the inflator 18. For example, in the embodiment shown in FIG. 4, the crossmember 72 may extend around the inflator 18 in the direction D. In other words, the crossmember 72 may extend from one leg 68a to the other leg 68b above the inflator 18. Said differently, the inflator 18 may be disposed between the crossmember 72 and the lower portion 24 of the bracket 20 in the direction D. As another example, crossmember 72 may extend around the inflator 18 about the axis extending through the seat bottom 38 and the floor 34. In other words, the crossmember 72 may be disposed inboard of the inflator 18. Said differently, the inflator 18 may be disposed between the crossmember 72 and the seat frame member 14.

The crossmember 72 may extend from one leg 68a to the other leg 68b in any suitable manner. For example, in the embodiment shown in FIG. 4, the crossmember 72 is elongated in the vehicle fore-and-aft direction Da from the upper portion 22 of one leg 68a to the upper portion 22 of the other leg 68b. In other words, the crossmember 72 may be substantially linear from one leg 68a to the other leg 68b. Alternatively, the crossmember 72 may extend about an axis, i.e., be curved.

The restraint system 12 may include a manifold 74 disposed inboard of the seat frame member 14, as shown in the Figures. The manifold 74 may be fixed to the bracket 20. For example, the manifold 74 may be fixed to the lower portion 24 of the bracket 20, as shown in the Figures. In this situation, the manifold 74 may be disposed between the seat frame member 14 and the end 70 of the lower portion 24 of the bracket 20, as shown in the Figures. Specifically, the manifold 74 may be compressed against the seat frame member 14. The manifold 74 may be fixed to the lower portion 24 of the bracket 20 in any suitable manner, e.g., fasteners. As another example, the manifold 74 may be fixed to the upper portion 22 of the bracket 20.

With reference to FIG. 3B, the manifold 74 may cover the hole 60. Specifically, the manifold 74 may abut the seat frame member 14 around the hole 60. In this situation, the airbag 16 and the seat frame member 14 may be compressed between the manifold 74 and the intermediate portion 26 of the bracket 20.

The manifold 74 may define a chamber 76 in fluid communication with the hole 60, i.e., the inflation chamber 54. In other words, fluid may flow freely between the inflation chamber 54 and the chamber 76. The manifold 74 may, for example, deflect fluid from the chamber 76 through the hole 60 into the inflation chamber 54. The restraint system 12 may, for example, compress the manifold 74 against the seat frame member 14 to reduce or prevent fluid from escaping the chamber 76 between the seat frame member 14 and the manifold 74, e.g., around the hole 60. Alternatively, the restraint system 12 may include a seal (not shown) extending around the hole 60 between the seat frame member 14 and the manifold 74. In other words, the seal may be compressed between the seat frame member 14 and the manifold 74 around the hole 60. The seal may prevent fluid from escaping the chamber 76 between the seat frame member 14 and the manifold 74, e.g., around the hole 60. The seal may be any suitable material, e.g., rubber.

The inflator 18 may be supported by the manifold 74. For example, the inflator 18 may extend into the chamber 76 and be disposed adjacent to the hole 60, as shown in FIG. 3B. In such an example, the inflator 18 may include a portion disposed in the chamber 76 and a portion disposed external to the chamber 76, e.g., adjacent to the upper portion 22. The inflator 18 may, for example, be press-fit into the opening. In other words, the inflator 18 may have an interference fit with the manifold 74, which may reduce or prevent fluid from escaping the chamber 76 around the inflator 18.

The inflator 18 may be elongated in the direction D, as shown in FIGS. 3A-4. In other words, the inflator 18 may extend vertically along the seat frame member 14. The inflator 18 may be disposed between the upper portion 22 of the bracket 20 and the lower portion 24 of the bracket 20. For example, the inflator 18 may extend in the direction D from the chamber 76 towards the upper portion 22 of the bracket 20, as shown in the Figures.

The inflator 18 is in fluid communication with the airbag 16 that inflates the airbag 16 from the uninflated position to the inflated position. The inflator 18 expands the airbag 16 with inflation medium, such as a gas, to move the airbag 16 from the uninflated position to the inflated position. Specifically, the inflator 18 may be in fluid communication with the inflation chamber 54 through the hole 60 to supply inflation medium to the inflation chamber 54.

The inflator 18 may be, for example, a pyrotechnic inflator that uses a chemical reaction to drive the inflation medium into the airbag 16. Alternatively, the inflator 18 may be, for example, a cold-gas inflator that, when activated, ignites a pyrotechnic charge that creates an opening for releasing the pressurized inflation medium to the airbag 16. Alternatively, the inflator 18 may be of any suitable type, for example, a hybrid inflator.

The restraint system 12 may include a support 62 engaged with the seat frame member 14. The support 62 may be disposed adjacent to the inflator 18, e.g., between the legs 68a, 68b of the bracket 20. The support 62 may be disposed between the at least one lower opening 56 and the at least one upper opening 58. Specifically, the support 62 may be disposed between the manifold 74, i.e., the hole 60, and the at least one upper opening 58, as shown in FIGS. 3A-4. The support 62 may be elongated in the cross-vehicle direction Dc. The inflator 18 may be fixed to the support, e.g., by fasteners. The support 62 and the seat frame member 14 may, for example, be separate components subsequently assembled together, e.g., by fasteners, welding, etc. As another example, the support 62 may be unitary with the seat frame member 14.

Figure 6:
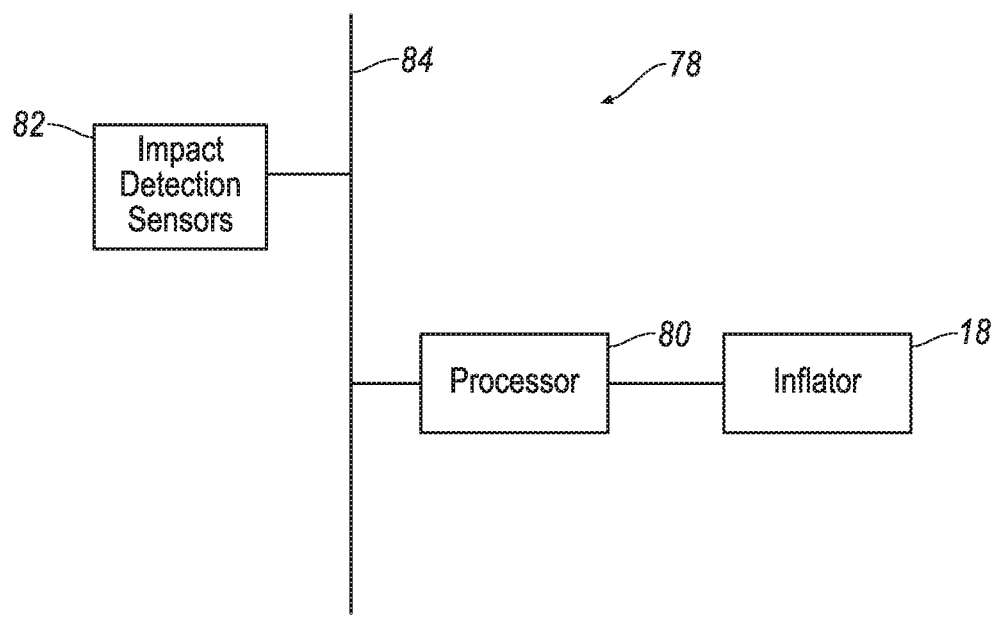
FIG. 6 is a block diagram of an inflation system of the vehicle.

With reference to FIG. 6, the vehicle 10 may include an inflation system 78 having a computer. The computer may be a microprocessor-based computing device implemented via circuits, chips, or other electronic components. For example, the computer may include a processor 80, memory, etc. The memory may store instructions executable by the processor 80 and the processor 80 may read the instructions from the memory and execute the instructions. The processor 80 may be programmed to initiate an inflation of the airbag 16 in response to the vehicle impact.

The vehicle 10 may include impact detection sensors 82 programmed to detect the vehicle impact to the vehicle 10. The impact detection sensors 82 may be disposed in the vehicle 10. The impact detection sensors 82 may be of various types, e.g., pressure sensor, acceleration sensor, vision sensor, etc. When the vehicle impact occurs, the processor 80 may receive one or more signals from the impact detection sensors 82 indicating the vehicle impact. In response to receiving the signals from the impact detection sensors 82, the processor 80 may initiate the inflation of the airbag 16. Alternatively, the processor 80 may initiate the inflation of the airbag 16 selectively based on information from the impact detection sensors 82 identifying the physical characteristics of the vehicle impact, e.g., which side of the vehicle impacted, amount of pressure applied to the vehicle 10, etc. and also seat occupancy information, e.g., by using the occupancy sensors disposed inside the seats 28 sensing the occupancy status of the seats 28.

In order to receive the signals from the sensors, e.g., the impact detection sensors 82, and to initiate the inflation of the airbag 16, the processor 80 communicates with the sensors, e.g., the impact detection sensors 82, and the inflator 18, e.g., through a direct electrical wiring, through which an analog or a digital signal is transmitted, or through a communication network 84 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

During operation, the airbag 16 is disposed in the seatback 36 in the uninflated position. Specifically, the airbag 16 may be disposed outboard of the seat frame member 14 and the inflator 18 may be disposed inboard of the seat frame member 14. The bracket 20 extends through the seat frame member 14 to support the airbag 16 and the inflator 18 on opposite sides of the seat frame member 14. By supporting the inflator 18 inboard of the seat frame member 14, the bracket 20 assists in reducing the width, i.e., the distance between the sides 48, 50 in the cross-vehicle direction Dc, of the seatback 36. In the event of a vehicle impact the impact detection sensors 82 detect the impact. The impact detection sensors 82 transmits a signal indicating the impact collision through the communications network 84 to the computer. When the impact is detected, the computer transmits a signal through the communications network 84 triggering the inflator 18 to inflate the airbag 16 with inflation medium from the uninflated position to the inflated position. When the inflator 18 inflates the airbag 16 to the inflated position, the inflation medium flows to the inflation chamber 54 increasing the pressure in the inflation chamber 54. Specifically, the inflation medium flows into the chamber 76 and is deflected by the manifold 74 through the hole 60 into the inflation chamber 54. As the pressure is increased in the inflation chamber 54, the airbag 16 breaks through the tear seam of the seatback 36. As the occupant slides off of the seat 28 due to momentum of the vehicle impact, the occupant moves towards the airbag 16 in the inflated position. When the occupant impacts the airbag 16, the airbag 16 may absorb energy from the occupant. The bracket 20 may support the airbag 16 in the inflated position. In other words, the airbag 16 may transfer energy from the occupant to the seat frame member 14 through the bracket 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a seat frame member;
an airbag disposed outboard of the seat frame member;
an inflator disposed inboard of the seat frame member; and
a bracket extending through the seat frame member and including an upper portion and a lower portion spaced from each other and disposed inboard of the seat frame member, and an intermediate portion extending from the upper portion to the lower portion and disposed outboard of the seat frame member, the bracket supporting the inflator and the airbag.

2. The system of claim 1, wherein the airbag defines an inflation chamber, the bracket extending through the airbag into the inflation chamber.

3. The system of claim 2, wherein the intermediate portion of the bracket is disposed in the inflation chamber.

4. The system of claim 2, further comprising a lower opening disposed adjacent to the lower portion and extending through the seat frame member and the airbag into the inflation chamber, the bracket extending through the lower opening.

5. The system of claim 2, further comprising an upper opening disposed adjacent to the upper portion and extending through the seat frame member and the airbag into the inflation chamber, the bracket extending through the upper opening.

6. The system of claim 2, further comprising a hole disposed between the lower portion and the upper portion and extending through the seat frame member and the airbag into the inflation chamber, the inflator being in fluid communication with the inflation chamber through the hole.

7. The system of claim 6, wherein the bracket includes two legs spaced from each other, the hole is disposed between the legs of the bracket.

8. The system of claim 6, further comprising a manifold disposed inboard of the seat frame and fixed to the lower portion of the bracket, the inflator supported by the manifold.

9. The system of claim 8, wherein the manifold is disposed adjacent to the hole and defines a chamber in fluid communication with the hole, the inflator extending into the chamber.

10. The system of claim 9, wherein the manifold abuts the seat frame member around the hole.

11. The system of claim 1, wherein the lower portion is elongated transverse to the upper portion.

12. The system of claim 1, wherein the intermediate portion is elongated from the lower portion to the upper portion.

13. The system of claim 1, wherein the upper portion is elongated parallel to the intermediate portion.

14. The system of claim 1, wherein the inflator is disposed between the upper portion and the lower portion of the bracket.

15. The system of claim 1, wherein the bracket includes two legs spaced from each other, the inflator is disposed between the legs of the bracket.

16. The system of claim 15, wherein the bracket includes a crossmember extending from one leg to the other leg, the crossmember extending around the inflator.

17. The system of claim 1, further comprising a manifold disposed inboard of the seat frame and fixed to the lower portion of the bracket, the inflator supported by the manifold.

18. The system of claim 17, wherein the airbag and the seat frame member are compressed between the intermediate portion and the manifold.

19. The system of claim 17, wherein the manifold defines a chamber, the inflator extends into the chamber and is in fluid communication with the airbag through the chamber.

20. The system of claim 17, further comprising a support disposed between the manifold and the upper portion of the bracket, the inflator fixed to the support.

* * * * *